July 17, 1962 J. W. I. HEIJNIS 3,044,628
PURIFICATION METHOD
Filed Dec. 3, 1959
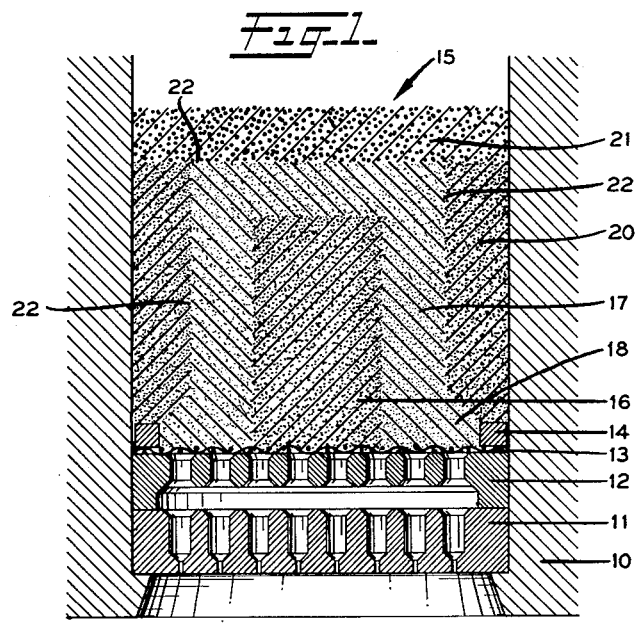
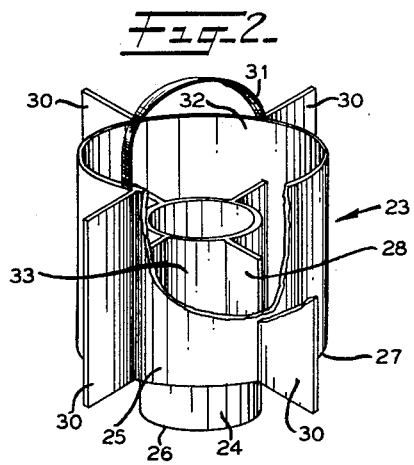
JAMES WATT IJSBRAND HEIJNIS
*INVENTOR.*
BY *Spencer L. Blaylock, Jr.*
HIS ATTORNEY

3,044,628
PURIFICATION METHOD
James Watt Ijsbrand Heijnis, Arnhem, Netherlands, assignor to American Enka Corporation, Enka, N.C., a corporation of Delaware
Filed Dec. 3, 1959, Ser. No. 857,198
Claims priority, application Netherlands Dec. 10, 1958
2 Claims. (Cl. 210—290)

This invention relates to filtration or purification of liquid and more particularly to a process for the production of a filter bed of granular materials.

Filter beds of granular materials are used in the purification of water, and the filtering of other liquids such as viscose spinning baths, etc. These filter beds find particular use in the filtration of the molten polymer in a melt spinning system such as the melt spinning of polyamides.

In the prior art, filter beds were composed of layers of granular material such as sand. A filter bed of this type is described in U.S. Patent No. 2,266,368 in which molten material passes through layers of progressively finer sand. In such filter beds extremely high pressures are needed to force the molten material through the sand layers because it was found that solids collect at the interface of the various layers. These interfaces were limited in area because of the small cross-sectional area of the spinning assembly, and the free flowing nature of the sand. Thus it was thought that the interfaces could not be enlarged.

It has been proposed in Belgian Patent No. 568,000 that a layer of fine sand be embedded between layers of coarse sand. The layer of fine sand could be shaped as a cone, a hemisphere, a cylinder, or a rectangular box. These shapes may be molded by using a binder, although the latter can be removed only with difficulty. This system increases substantially the interfaces between layers and thereby reduces the pressure needed, improves filtration, and reduces fouling of the interfaces by solids collected.

Notwithstanding the improved results, certain difficulties are present in application of the system described above. It is very time consuming and expensive to mold the various filter shapes. In addition, it is sometimes difficult to remove the binder after the filter bed has been constructed.

It is therefore an object of this invention to provide a process for the production of a filter bed that is free of the difficulties of the prior art.

It is a further object of this invention to provide a process for the economical production of a melt spinning filter bed.

An additional object of this invention is to provide a process for the purification of liquids, particularly melt spinning masses.

It is another object of this invention to provide a process for the production of a filter bed in which the total filtering surface of the finest granular material is greater than the cross-sectional area of the filter bed.

A still further and more specific object of this invention is to provide a process for the production of a melt spinning filter bed that does not require the use of a binder.

These and other objects, which will become apparent to those skilled in the art, may be accomplished by dividing an elongated cylindrical compartment within which the filter bed is to be formed into one central and at least two concentric annular sections. The central section is filled with a coarse granular material. The inner annular section, a portion of the lower end of the outer annular section, and the upper end of the central section are then filled with a fine granular material. The remainder of the outer annular section and the upper end of the central and annular sections are then filled with a coarse granular material.

The apparatus that is used to accomplish the above objects comprises a first tubular member which defines a central cylindrical section. At least one second tubular member of substantially the same length as the first is provided to define at least inner and outer annular sections coaxially disposed with respect to the central section. The second tubular member is secured in radially spaced and axially displaced coaxial relationship to the first tubular member. This apparatus is spaced coaxially of an elongated cylindrical compartment of a filter bed.

At least two vertical and coaxial hollow cylinders of substantially the same length are placed into and centered in the elongated cylindrical compartment of the filter bed. The more centrally positioned cylinders are placed lower than the outer cylinders. It is possible to use more than two cylinders; however, in the preferred embodiment of this invention only two cylinders are used. The filter bed is of limited cross-sectional area, thus a limited number should be used to permit proper filtration.

The central cylinder is filled with a coarse granular material and then the next cylinder is filled with a fine granular material. A portion of this granular material will fill the lower portion of the space outside of this cylinder because of its raised position. In addition, the fine material will also cover the coarse material in the center. The compartment, if only two cylinders are used, is then filled with a coarse granular material. The cylinders are then removed and a coarse granular material is placed in the compartment to cover all the material therein.

The cylinders preferably are secured to each other by radial partitions which insure relative centering and facilitate removal of the unit. The outer cylinder is also provided with radial partitions which extend to the walls of the filter bed. These latter partitions center the apparatus in the filter bed and insure that all filter beds are of substantially the same shape and construction.

It can readily be seen that this process and apparatus do not require the use of a binder or molds, but rather permit the direct introduction of the filtering material into the filter bed in a loose condition. This can be done rapidly and very economically as compared to the molding process. When the cylinders are removed, there is little if any intermixing of the granular materials, with the result that there is provided in the filter bed a distinct interface between the various filtering materials.

Various kinds of granular materials may be used; the only requirement is that they be inert to the material to be filtered. Fine and coarse grained sand is very suitable and is the preferred filtering material because of its hardness, its low cost and its inertness to many filterable materials.

The cylinders may be removed simply by pulling them out of the filter bed, and a handle may be provided for this purpose. They may also be vibrated by any conventional means and then removed. This vibration and removal does not displace appreciably the various filtering materials because there is only a slight displacement of the various filtering materials.

The filter beds produced according to this invention may be used for the filtration of liquids, such as viscose spinning baths, and they may be used for the purification of water. They find particular utility in the melt spinning of a molten material such as a polyamide. In such a process the molten material is forced through the filter bed just prior to spinning.

It is desirable in melt spinning to have the filter bed of substantially the same diameter as the spinning plate which of necessity is small. Thus it can be seen that this process and apparatus will permit the production of a melt spinning filter bed because as the filtration proceeds in a radial direction, this invention permits an increase in filtering surface without a corresponding increase in diameter of the filter bed.

This invention produces a filtering bed of inert granular materials in which the total filtering surface of the finest inert granular material is larger than the cross-sectional area of the filter bed. The finest granular material is in the shape of a hat, the radial rim of which extends to the elongated cylindrical compartment wall. It is possible by the use of more than two cylinders to form the finest material into a plurality of hat-shaped bodies. In the preferred embodiment, only one hat-shaped body would be formed. The coarse granular material would be placed inside and outside these hat-shaped bodies.

In melt spinning it has been found that only two cylinders are necessary to provide suitable filtration. The inner cylinder and the sand placed inside and outside of the cylinders is poured upon a layer of gauzes. These are conventional and form no part of the invention but may serve to support the sand within the filter bed. Any material that will permit passage of the molten material but will not permit passage of the sand may be used equally well in this invention.

Other advantages and objects will become apparent as a preferred embodiment of this invention is explained in detail with reference to the accompanying drawing, in which:

FIGURE 1 is a sectional view of a melt spinning assembly in which a filter bed has been constructed according to this invention, and FIGURE 2 is a perspective view, partially broken away, of one embodiment of the apparatus of this invention by which the filter beds may be produced.

Referring now to FIGURE 1, reference numeral 10 denotes a housing for the spinning assembly of a melt spinning apparatus. Housing 10 defines an elongated cylindrical opening or compartment in which a filter bed is placed. A spinning plate 11, a supporting plate 12, and gauzes 13 are placed in the lower end of the compartment. Gauzes 13, supporting plate 12, and spinning plate 11 are held in place within the compartment of housing 10 by pressure and sealing ring 14. These are conventional in melt spinning and, per se, form no part of this invention. Pressure ring 14 is of conventional design and any other pressure and sealing device may be used equally well in the practice of this invention.

The filter bed indicated generally at 15 is constructed by the process and apparatus of this invention. A cylindrical core 16 of coarse grained sand is positioned on gauzes 13. A hat-shaped body 17 of fine grained sand is positioned around and covers core 16. The radial rim 18 of hat-shaped body 17 extends into contact with pressure ring 14. The space between body 17 and ring 14 is filled with coarse grained sand to form a mantle 20. A layer 21 of very coarse grained sand is positioned over the top of body 17 and mantle 20 to cover the interior of housing 10.

Filter bed 15 is thus provided with a filtering surface 22 which is the interface between body 17 and mantle 20. This surface can easily be seen to be larger than the cross-sectional area of the filter bed 15. A melt traveling from layer 21 toward spinning plate 11 will tend to follow this shortest route through the fine grain sand because of the resistance exerted by the finer material. Thus the melt will flow through body 17 in a pattern substantially perpendicular to surface 22.

Filter bed 15 was produced by the filter forming apparatus indicated generally at 23, as shown in FIGURE 2. Apparatus 23 comprises two coaxial hollow cylinders 24 and 25. Cylinders 24 and 25 are of substantially equal length and may be constructed of any suitable material such as steel. Cylinder 24 is centered inside of cylinder 25 and is axially displaced relative thereto. Thus the lower end 26 of cylinder 24 is below the lower end 27 of cylinder 25. Cylinders 24 and 25 are secured to each other by radial partitions 28. Radial partitions 30 are secured to the outside of cylinder 25 in order to position apparatus 23 centrally within the compartment of a melt spinning housing 10. A handle 31 is secured to the upper end 32 of cylinder 25 to permit easy removal of the apparatus after the filter bed is formed.

In operation, apparatus 23 is positioned inside housing 10 and is placed on gauzes 13. Cylinder 24 is filled with coarse grained sand to form cylindrical core 16. The space 33 between cylinders 24 and 25 is filled with fine grained sand. The sand thus covers core 16 and extends under the lower end 27 of cylinder 25 to pressure ring 14 and thereby forms hat-shaped body 17. Coarse grained sand which may or may not be of the same size grains as that in core 16 is placed in the space between cylinder 25 and housing 10 thereby forming mantle 20.

Apparatus 23 is removed from the compartment of housing 10 by pulling it out or vibrating it and then removing it. The entire bed is then covered with a very coarse sand to form layer 21.

It can be seen from the foregoing that a filter bed having a total filtering surface larger than the cross-sectional area of the filter bed may be provided economically and easily without the use of a binder and a mold. This produces a filter bed whose transition surface or interface between layers does not foul as rapidly as those of the prior art. This results in a substantial reduction in the pressure needed to force the material through the filter bed.

The apparatus of this invention also permits the operator to produce substantially identical filter beds in each melt spinning system. This will insure uniformity of filtration.

It should be understood that modifications may be made in this invention without departing from its spirit and scope which is to be limited only by the following claims.

What is claimed is:

1. A method of forming a filter bed in a melt spinning assembly comprising the steps of dividing an elongated cylindrical filtering compartment having an entrance and a discharge end into one central and at least two concentric annular sections by means of a plurality of coaxial hollow cylinders; filling the central section with coarse granular filter material in loose form; filling the inner annular section, a portion of an outer annular section at the discharge end of said compartment, and enclosing said central section at the entrance end of said compartment with fine granular filter material in loose form; filling the remaining portion of said outer annular section with coarse granular filter material in loose form; removing said coaxial hollow cylinders and thereby joining the interfaces of the sections so as to allow the adjacent coarse and fine loose granular materials to remain in a substantially separated condition; and covering both the central and annular sections with coarse granular filter material at the entrance end of said compartment.

2. A method of forming a filter bed in a melt spinning assembly comprising the steps of dividing an elongated cylindrical filtering compartment having an entrance and a discharge end into one central and at least two concentric annular sections by means of a plurality of coaxial hollow cylinders; filling the central section with coarse sand in loose form; filling the inner annular section, a portion of an outer annular section at the discharge end of said compartment, and enclosing said central section at the entrance end of said compartment with fine sand in loose form; filling the remaining portion of said outer annular section with coarse sand in loose form; removing said coaxial hollow cylinders and thereby joining the interfaces of the sections so as to allow the adjacent coarse and fine, loose sand particles to remain in a substantially separated condition; and covering both the central and annular section with coarse sand at the entrance end of said compartment.

References Cited in the file of this patent

UNITED STATES PATENTS

| | | |
|---|---|---|
| 965,150 | Atterbury | July 26, 1910 |
| 974,350 | Bratton | Nov. 1, 1910 |
| 1,171,579 | Atterbury | Feb. 15, 1916 |
| 2,266,363 | Graves | Dec. 16, 1941 |

FOREIGN PATENTS

| | | |
|---|---|---|
| 603,528 | Great Britain | June 17, 1948 |
| 1,196,386 | France | May 25, 1959 |